Jan. 7, 1947.  E. P. ROSS ET AL  2,413,847
COMPUTING INSTRUMENT
Original Filed March 31, 1932
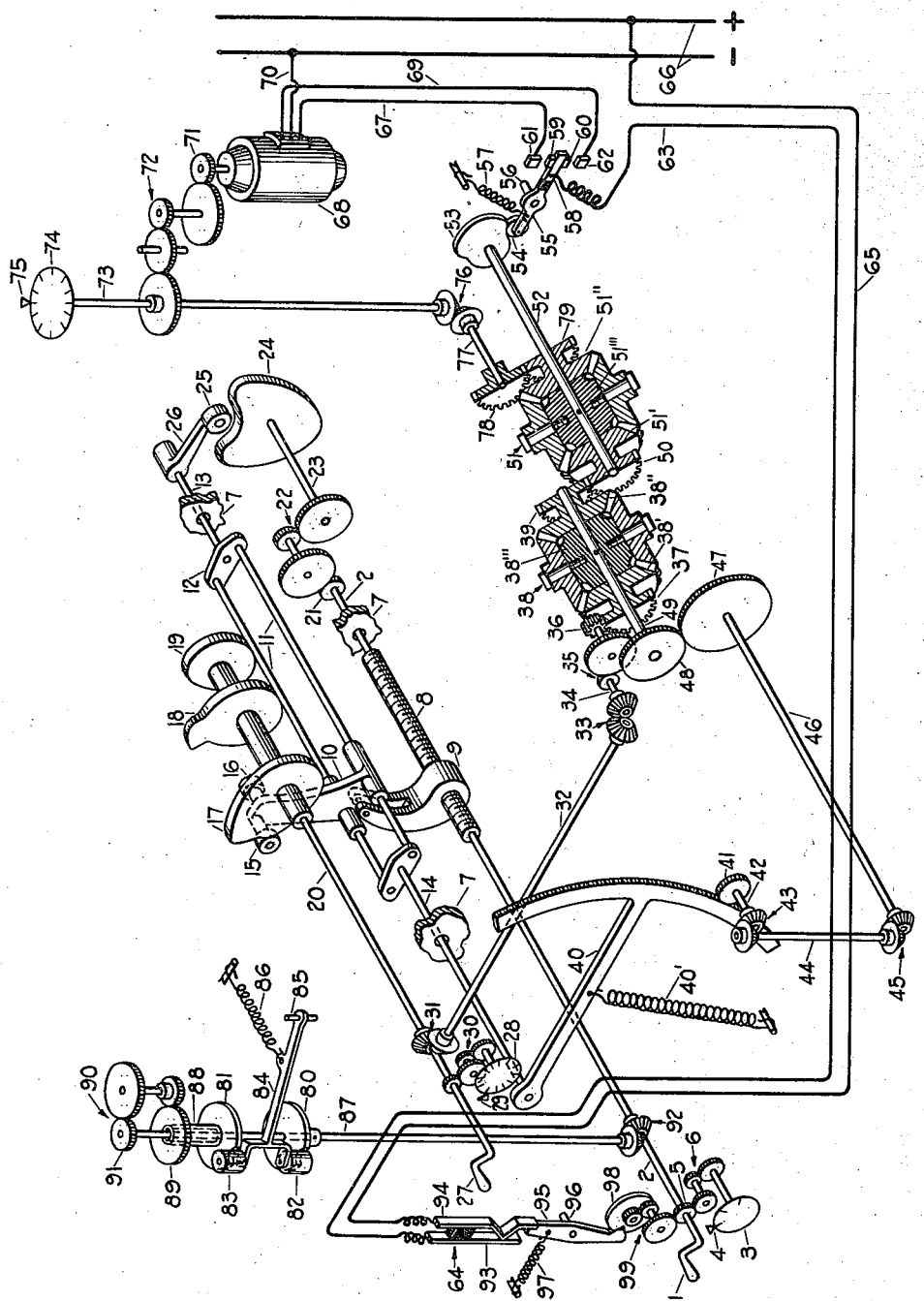
INVENTORS
Elliott P. Ross
Harry S. Marsh
BY
ATTORNEYS Patented Jan. 7, 1947

2,413,847

UNITED STATES PATENT OFFICE 2,413,847

COMPUTING INSTRUMENT

Elliott P. Ross, Forest Hills, and Harry S. Marsh, Great Neck, N. Y., assignors to Ford Instrument Company, Inc., Long Island City, N. Y., a corporation of New York Application March 31, 1932, Serial No. 602,375
Renewed June 18, 1936

7 Claims. (Cl. 235—61.5)

This invention relates to computing instruments and more particularly to instruments for computing values of quantities which vary with respect to other quantities, such for instance as ballistic data relating to fire control problems. In such cases the quantities to be determined usually vary non-uniformly from a straight line plotted with respect to coordinate axes.

It is an object of the invention to produce an instrument of simple construction for obtaining directly without modification the correct values of the required quantities by algebraically combining the amounts by which they vary from an assumed straight line or linear function with the values of such assumed linear function.

In general the instrument consists of a plurality of simple cams the contour of each of which is based on a different value of a factor of which the required quantity is a function, the radial distances from the center of the cams to their peripheries representing the exact values of the differences between the required quantity and for linear values of the assumed straight line function. Cooperating with these cams is a follower which may be brought, by suitable shifting mechanism, into coacting relation with the proper cam to compute the required quantity at the chosen value of the factor. The displacements of the follower are transmitted, preferably by means of a follow-up mechanism, to a device where they are combined with the corresponding values of the assumed straight line function to give the required corrected values of the quantity. The instrument also includes means for rendering the transmitting mechanism inoperative during the shifting of the follower from one cam to another and means for locking the follower shifting mechanism against accidental motion in each position of adjustment of the follower relative to the cams. This latter means also serves to indicate to the operator of the instrument when the follower is in proper coacting relation with any one of the cams.

The particular nature of the invention as well as other objects and advantages thereof will appear most clearly from a description of a preferred embodiment thereof as shown in a diagrammatic manner in the single figure of the drawing. For purposes of illustration the invention has been embodied in an instrument for computing the sight depression, that is, the elevation of the gun above the line of sight required for the trajectory of its projectile.

The instrument shown is adapted to compute the sight depression for any one of three predetermined values of initial velocity of the projectile. It is of course obvious, as will appear hereinafter, that the instrument may be arranged to compute the sight depression for any one of a greater or lesser number of predetermined values of initial velocity.

The initial velocity at which the projectiles are to leave the gun or guns is communicated to the operator at the instrument who will set the instrument for computation at this value of the initial velocity by bringing the proper sight depression cam into operational engagement with the computing mechanism of the instrument. This is done by turning the initial velocity crank 1, mounted on shaft 2, until the chosen value of the initial velocity is indicated on dial 3 opposite index 4. Dial 3 is driven by shaft 2 through a pinion 5 mounted thereon which meshes with a speed reducing gear train 6 on the output shaft of which dial 3 is mounted. The speed reducing gear train is such that the dial will make but a fraction of a revolution for a plurality of revolutions of shaft 2. Shaft 2 is mounted for rotation in a frame member 7 and carries between this member and crank 1 an elongated screw 8 coaxial therewith. In engagement with screw 8 is a forked nut 9 between the prongs of which is pivoted a cam follower arm 10 slidably mounted on guides 11 of a frame member 12 which is supported for rotation by shafts 13 and 14 pivoted at different points in frame member 7.

Cam follower arm 10 carries two cam followers 15 and 16 rotatively mounted thereon. These followers are so located as to enable one or the other of them to follow sight depression cams of markedly different contours. The followers are placed on different sides of the follower arm and are so spaced therefrom that when one is in following contact with one of the sight depression cams the other will be out of the path of the adjoining cam. These sight depression cams are designated 17, 18 and 19, and are coaxially arranged on a shaft 20 to be rotated therewith. The contour of each cam is different and is based on a different value of the initial velocity. The values of the initial velocity upon which the cams are based are scribed on the face of dial 3. Shaft 2 terminates in a pinion 21 which drives a speed reducing gear train 22 to which is connected by means of shaft 23 the heart shaped cam 24. A cam follower 25 carried by an arm 26 fixed to the end of shaft 13 is positioned in the plane of the heart cam 24.

As shaft 2 is rotated during the change of setting of the instrument, nut 9 will be carried along the axis of screw 8 and will cause follower arm 10 to slide on guides 11 of frame 12 to carry cam follower 15 or 16 out of contact with the cam corresponding to the last setting and into position to co-act with the cam corresponding to the new setting. Due to the shape and arrangement of cam follower arm 10 it is necessary to swing it out of the way of the cams to avoid interference during the change of setting. This is accomplished as shaft 2 rotates by the rotation of pinion 21, speed reducing gear train 22, and shaft 23 which rotate heart cam 24. As cam 24 rotates, in either direction, it will offer to the contact of cam follower 25 a radius greater than that offered in the position shown in the drawing. This causes cam follower 25, arm 26, shafts 13 and 14, frame 12 and follower arm 10 to rotate in a direction to carry arm 10 and cam followers 15 and 16 out of the way of cams 17, 18 and 19. The ratio of the speed reducing gear train 22 is such that the cam 24 makes one revolution for each change of position of arm 10 from one cam to the next due to the rotation of shaft 2. As the cam 24 nears the end of each setting movement the slope of the cam permits the arm 26 to rotate in the reverse direction so that when the end of the setting period is reached the follower 25 is opposite the notch of cam 24 and one of the cam followers 15 and 16 on the follower arm 10 is aligned with and free to follow the contour of the selected cam 17, 18 or 19.

Assuming that the drawing represents the condition of the instrument after it has been adjusted to compute the sight depression at the value of the initial velocity communicated to the operator, and that the operator has also received the range of the target, the operator will then rotate range crank 27 carried at the end of shaft 20 until the desired value of the range is indicated on dial 28 opposite index 29, dial 28 being driven from shaft 20 through a speed reducing gear train 30. The rotation of shaft 20 will through bevel gears 31, shaft 32 and bevel gears 33 cause a like rotation of shaft 34 upon which is fixed a pinion of a gear train 35 which terminate in a pinion 36 in mesh with a gear 37 forming an integral part of the side 38' of differential 38. Gear train 35 converts the rotation due to the range input into a rotation which is equivalent to the linear value of the assumed straight line function of the sight depression corresponding to the range input. Since the center 38''' of the differential 38 is connected to a train of elements which for the present can be considered as holding it against rotation, the rotation of side 38' will be transmitted to side 38'' to cause the rotation of gear 39 integral therewith.

As shaft 20 is rotated, cams 17, 18 and 19 will also be rotated and cam 17, in this instance, will offer a radius to the contact of cam follower 15 which is equivalent to the amount by which the sight depression curve differs from the straight line function of the sight depression at the input value of the range. Movement of follower arm 10 through frame 12 causes a corresponding rotation of shafts 13 and 14. The movement of shaft 14 is transmitted through gear sector 40 carried fixed thereto, to a pinion 41 mounted on shaft 42. A spring 40' connected to the frame of the instrument and the gear sector 40 serves, through gear sector 40, shaft 14, frame 12, and follower arm 10, to hold cam follower 15 or 16 in constant contact with the face of cam 17, 18 or 19 except when the followers 15 and 16 are forcibly held out of contact with cams 17, 18 or 19 by the cam 24 and the arm 26 during the operation of shifting from one cam to another. The rotation of shaft 42 is transmitted through bevel gears 43, shaft 44, bevel gears 45 and shaft 46 to a gear 47 which meshes with a gear pinion 48 fixed to shaft 49 which carries the center 38''' of the differential 38.

Considering now side 38' as fixed, center 38''' will rotate side 38'' in accordance with the value of the difference between the sight depression curve and the straight line function of the sight depression at the range input value and will algebraically combine this value with the value of the straight line function set into the differential by the previously described rotation of side 38' so that the net rotation of side 38'' and gear 39 will be equal to the corrected value of the sight depression at the input range value. Gear 39 meshes with gear 50 which is an integral part of side 51' of differential 51. Since side 51'' may for the present be considered as fixed, side 51' will rotate center 51''' and shaft 52 upon which the center 51''' is fixed.

Shaft 52 carries at its end a cam 53 on the surface of which bears a cam follower 54 carried by a lever 55 pivoted on a pin 56 fixed to the frame of the instrument. A spring 57 having one end fixed to the instrument frame and the other end to lever 55 serves to hold cam follower 54 in constant contact with cam 53. Lever 55 carries at its other end and insulated therefrom a double contact arm 58 having contacts 59 and 60 adapted to contact with fixed contacts 61 and 62 respectively upon proper movement of lever 55. Contact arm 58 is connected through conductor 63, cutout switch 64 and conductor 65 to the plus side of the D. C. supply line 66. A conductor 67 connects fixed contact 61 to one of the field terminals of reversible D. C. servo motor 68, the other field terminal of the motor being connected through conductor 69 to the fixed contact 62. The armature terminal of the motor is connected through conductor 70 to the minus side of the D. C. supply line 66.

As shaft 52 rotates in response to the computed value of the sight depression, cam 53 will rotate therewith and will displace cam follower 54 from its normal position on the slope of the cam 53. This displacement of cam follower 54 will cause lever 55 and contact arm 58 to move about pivot 56 to carry one or the other of the contacts 59 and 60 into contact with its respective fixed contact, thereby closing the electric circuit and energizing motor 68. The rotation of motor 68 is transmitted through pinion 71 and speed reducing gear train 72 to shaft 73 which carries a dial 74 upon which, opposite index 75, may be read the computed value of the sight depression. Rotation of shaft 73 will through bevel gears 76 and shaft 77 cause gear 78 to rotate. Gear 78 meshes with gear 79 which is integral with side 51'' of differential 51, and since side 51' may temporarily be considered as fixed, rotation of side 51'' under the action of motor 68 will rotate center 51''' and shaft 52 to algebraically combine the previously described rotation of side 51' with the rotation of side 51''.

When the algebraic rotation of shaft 73 and gear 50 are equal or equivalent, the sum of the rotations applied to shaft 52 is zero, and shaft 52 will have carried cam 53 and contact arm 58 back to the position shown in the drawing and motor 68 will have been deenergized. If, for any reason, the rotation of shaft 52 is reversed due to reversal of rotation of side 51' or the rotation of side 51" due to motor 68 exceeds the rotation of side 51', then the arm 58 will be moved to reverse the direction of rotation of motor 68. The motor will run in this direction until the sum of the rotation is zero when its circuit will be opened by contact arm 58 moving back to the open circuit position. The action of the motor 68 is very rapid and the motor will respond to and remove each increment of movement of shaft 52 with the result that cam follower 54 will never be very far from its normal position on the slope of the cam.

In the preferred embodiment the follow-up mechanism has been shown and described as including a reversible D. C. motor 68, but the invention is not limited to the use such motor as a reversible A. C. motor or other reversible electrically operated rotation generating means may equally well be used.

The instrument is provided with a detent mechanism to lock shaft 2 against accidental motion in each of the positions of arm 10 relative to cams 17, 18 and 19. The detent mechanism also serves as a means for facilitating the bringing of follower arm 10 and the cam followers 15 and 16 in exactly the proper positions relative to cams 17, 18, 19. This detent mechanism comprises two notched discs 80 and 81 into the notches of which rollers 82 and 83, carried by a Y shaped lever 84 pivoted on a pin 85 fixed to the frame of the instrument, are adapted to be held by the force exerted by spring 86 which has one end connected to lever 84 and the other end to the frame of the instrument. Disc 80 is mounted on shaft 87 to rotate therewith and disc 81 is carried by a collar 88 concentric with shaft 87 but of such size as to be freely rotatable thereon. To collar 88 is also fixed a gear 89 which forms part of the speed reducing gear train 90 driven from shaft 87 by pinion 91. Shaft 87 is driven by shaft 2 through bevel gears 92. Speed reducing gear train 90 is so arranged that disc 81 will make but one revolution during each change of position of follower arm 10.

Assuming that the elements of the instrument are positioned as shown in the drawing and it is desired to carry cam follower 16 into contact with cam 18. The operator will initially have to exert sufficient force at crank 1 to overcome the force of spring 86 which tends to hold rollers 82 and 83 in the notches of discs 80 and 81. As shaft 2 rotates shaft 87 through bevel gears 92, the roller 82 will be carried out of the notch of disc 80 and will be caused to bear against the normal periphery of the disc 80. The force required at crank 1 to rotate shaft 2 will then be diminished since the rollers 82 and 83 are no longer embraced by the notches in the discs. When disc 80 has almost completed one revolution the notch of disc 81 will be out of line with roller 83 and roller 83 will be in contact with the normal periphery of this disc until within a revolution of shaft 2 from the end of the adjustment movement thereof when the notch of disc 81 will begin to align itself with roller 83. At this time however the normal periphery of disc 80 will be offered to contact with roller 82 and latching prevented until the time when both notches are aligned with their respective cooperating rollers. This will occur at exactly the time when arm 10 and cam follower 16 are properly located relative to cam 18. At this time the force necessary to move crank 1 will suddenly increase and the operator will thus be made aware that the adjustment is completed.

Since the instrument includes an electric motor the circuit control mechanism of which is affected by the movement of the elements above described a cut-out switch 64 is provided to render it impossible to energize the circuit of the motor during the change of position of follower-arm 10. This switch 64 has a fixed contact member 93 which is connected through conductor 63 to contact arm 58 of the motor circuit control mechanism, and a movable spring contact member 94 which is connected through a conductor 65 to the plus side of a D. C. supply line 66. Thus when contact members 93 and 94 are separated the motor cannot be energized. To separate the contact members a lever 95 pivoted on pin 96 fastened to the frame of the instrument is provided. One end of the lever is normally maintained away from contact member 94 by a spring 97 which has one end fastened to the frame of the instrument and the other end fastened to this end of the lever. Spring 97 also serves to keep the other end of the lever 95 in contact with a notched disc 98 which is driven by shaft 2 and pinion 5 through a speed reducing gear train 99. The gear train is such that disc 98 will make one revolution during each change of position of follower arm 10 relative to the cams. As shaft 2 begin to rotate the end of lever 95 which is in contact with disc 98 will be carried out of the notch and onto the normal periphery of the disc. This will cause lever 95 to move about its pivot so that the end which cooperates with spring contact member 94 will come in contact therewith and will carry it away from contact member 93. When the adjustment is completed disc 98 will again offer the notch to the contact of lever 95, thus allowing spring 97 to carry the lever 95 out of contact with the spring contact member 94 to allow contact spring member 94 to again contact with contact member 93.

While a preferred embodiment of the invention has been shown and described it will be understood that the invention may be embodied in other forms and various changes may be made in structural details without departing from its principle as defined in the appended claims.

We claim:

1. In an instrument for computing the value of a quantity which varies with respect to another quantity, the combination of a member, quantity converting means for displacing the member in accordance with an assumed value of the first quantity with respect to the second quantity, a plurality of separate devices each representing the amount by which the first quantity differs from the assumed value for a predetermined value of a factor affecting the values of the first quantity for any particular value of the second quantity, means for displacing the devices in accordance with the value of the second quantity, an element adapted to co-act with the devices one at time, means for shifting the element into co-acting relation with any desired one of the devices in accordance with the predetermined values of the factor, a second member operable by said element and means for combining the resultant displacements of the members.

2. In an instrument for computing the value of a quantity which varies with respect to another quantity, the combination of a member, quantity converting means for displacing the member in accordance with an assumed value of the first quantity with respect to the second quantity, a plurality of separate devices each representing the amount by which the first quantity differs from the assumed value for a predetermined value of a factor affecting the values of the first quantity for any particular value of the second quantity, means for displacing the devices in accordance with the value of the second quantity, an element adapted to co-act with the devices one at a time, means for shifting the element into co-acting relation with any desired one of the devices in accordance with the predetermined values of the factor, a second member operable by said element, means for combining the resultant displacements of the members, power operated indicating means for indicating said resultant displacements and means effective while the element is being moved from one to another of the devices to render the indicating means uninfluenced during the displacement of the element.

3. In a computing device a plurality of spaced cams, a shaft mounting said cams, a cam follower element, a pivoted carriage mounting said follower element for rotation therewith, said follower element being movable longitudinally independently of said carriage, trunnions for said carriage, a second shaft, an elongated screw mounted thereon, a nut on said screw operatively connected to said follower element to move said follower longitudinally of said carriage whereby said follower element may be brought into co-operative relation with any desired one of said cams to be displaceable thereby, a second follower element mounted on one of said trunnions to move therewith, a cam co-operating with said second follower element, and means connecting said last mentioned cam with said second shaft whereby as said second shaft is rotated to move said first mentioned follower element from one to another of said plurality of cams said last mentioned cam displaces said second mentioned follower element to move said first mentioned follower element away from said plurality of cams and to allow said follower element to come back into displacing relation when said follower element is again aligned with one of said plurality of cams.

4. In a computing device a plurality of spaced cams, a shaft mounting said cams, a cam follower element, a pivoted carriage mounting said follower element for rotation therewith, said follower element being movable longitudinally independently of said carriage, a second shaft, an elongated screw mounted thereon, a nut on said screw operatively connected to said follower element to move said follower longitudinally of said carriage whereby said follower element may be brought into co-operative relation with any desired one of said cams to be displaceable thereby, a second follower element rigid with said carriage to move therewith as it is rotatively actuated, a cam co-operating with said second follower element, and means connecting said last mentioned cam with said second shaft for actuation thereby to operate said second follower element and carriage whereby the first mentioned follower element is displaced to clear said cams as it is moved longitudinally of said carriage.

5. In a computing device a plurality of spaced cams, a shaft mounting said cams, a cam follower element, a pivoted carriage mounting said follower element for rotation therewith, said follower element being movable longitudinally relative to said carriage, trunnions for said carriage, a second shaft, an elongated screw mounted thereon, a nut on said screw operatively connected to said follower element to move said follower element longitudinally of said carriage whereby said follower element may be brought into cooperative relation with any desired one of said cams to be displaceable thereby, a differential having a plurality of input elements and an output element, means connecting said first shaft to one of the input elements, means connecting one of said trunnions to another input element, a second differential having a plurality of input elements and an output element, means connecting one of the input elements of the second differential with the output element of the first differential, an electric motor, a value indicating means operated thereby, a motor control means, and means connecting said value indicating means to another input element of the second differential.

6. In a computing device, a plurality of predeterminedly spaced axially aligned cams, means for turning said cams, a cam follower, means including a rotatable element for moving said cam follower axially of said cams to a selected one thereof, and governing means connected with said rotatable element comprising members rotatable at different speeds to periodically come into positional agreement at times when said cam follower is in cooperative relationship with one or another of said cams and latching means effectively co-acting with said members only when they are in positional agreement thereby restraining said rotatable element and maintaining said cam follower in alignment with the selected cam.

7. In a computing instrument, the combination of a plurality of axially aligned rotatable cams, a pivoted frame, a cam follower movably mounted on the frame, means for axially moving the follower with respect to the frame into engageable relation with any one of the cams, means associated with the moving means for maintaining such engageable relation at predetermined positions of the moving means, means for rotating the cams to cause displacement of the follower and the frame on which it is mounted and means associated with the moving means for turning the frame to displace the follower angularly out of the path of the cams while it is being moved from one cam to another.

ELLIOTT P. ROSS.
HARRY S. MARSH.